Patented Sept. 20, 1932

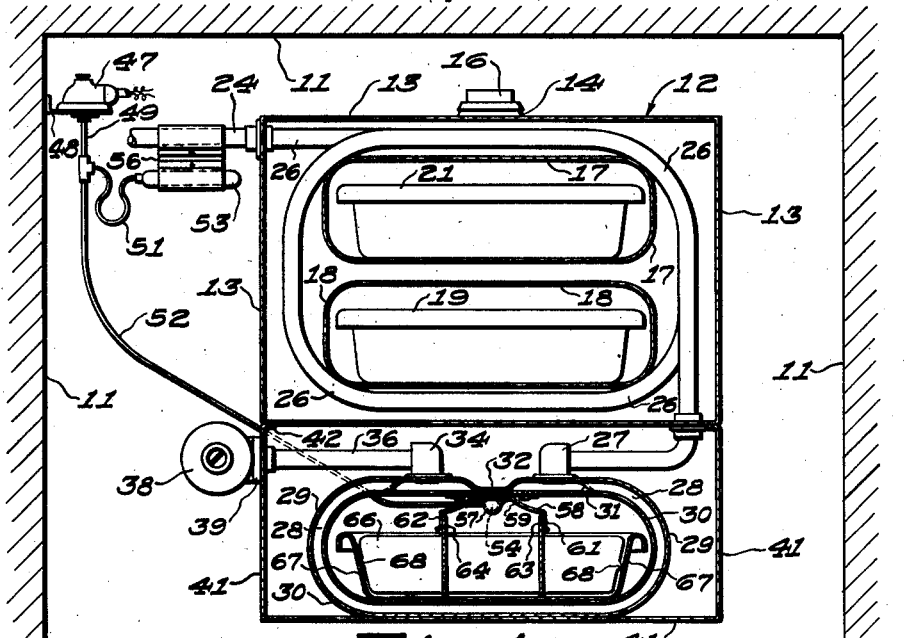
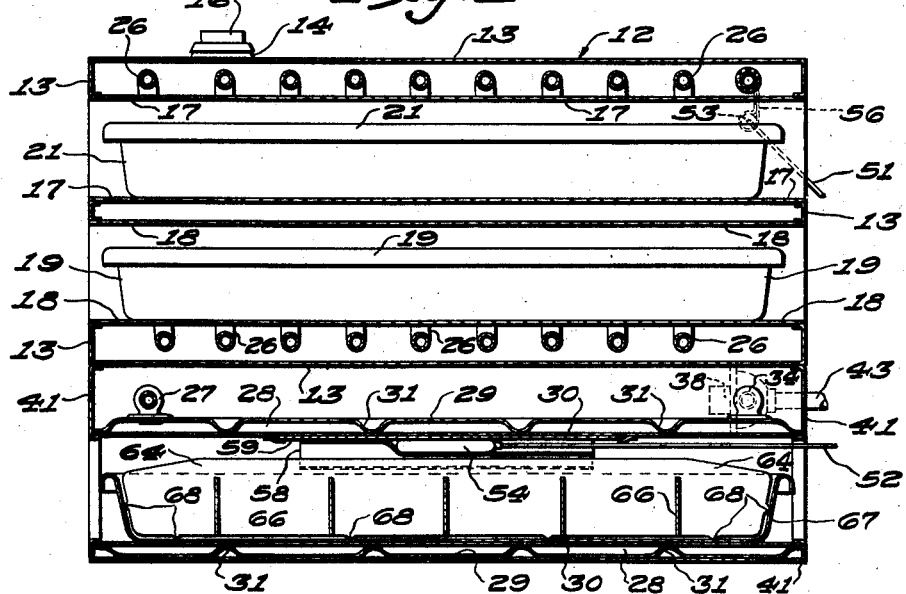
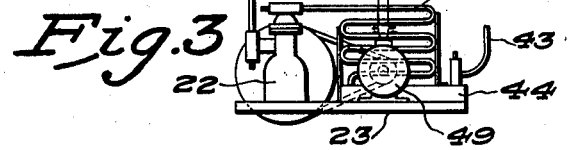

1,878,301

UNITED STATES PATENT OFFICE

CHARLES C. THOMAS, OF DETROIT, MICHIGAN, ASSIGNOR TO KELVINATOR CORPORATION, OF DETROIT, MICHIGAN, A CORPORATION OF MICHIGAN

TEMPERATURE CONTROLLING DEVICE FOR REFRIGERATING MACHINES

Application filed April 11, 1929. Serial No. 354,317.

This invention relates to artificial refrigeration apparatus and it has particular relation to refrigerant evaporating units capable of embodiment in apparatus of the above designated character.

An object of the invention is to provide an artificial refrigeration apparatus capable of maintaining the temperature of the interior of a refrigerator cabinet at a predetermined low value suitable for the preservation of foods and simultaneously to be capable of reducing water and other food substances quickly to a frozen state.

Another object of the invention is to provide an apparatus for reducing water and other food substances to a frozen state which shall be entirely automatic in its operation.

Another object of the invention is to provide an artificial refrigeration apparatus having a control mechanism, the operation of which is effected as a function of the temperature of widely separated portions of a refrigerant evaporating unit.

Another object of the invention is to provide a thermostatic control mechanism which shall be operable in response to the temperature of a fluid substance contained in a freezing tray and of an end portion of a suction line disposed remotely to the aforesaid freezing tray.

The invention is characterized by a refrigerant evaporating unit comprising, a brine tank in which a section of an evaporating conduit is located, and a hollow freezing sleeve disposed in spaced relation to the tank but connected to the aforesaid conduit. While the brine tank is provided with interiorly disposed sleeves for the reception of freezing trays in which various substances can be frozen, this portion of the evaporating unit is more especially applicable for the purpose of cooling the interior of the refrigerator. The freezing device, which is located immediately below the aforesaid brine tank, is specially applicable for the purpose of freezing various fluid substances much more quickly than such substances could be frozen in the freezing tray sleeves embodied in the brine tank.

The invention also comprehends an embodiment of a thermostatic control device, for effecting the operation of a refrigerant condensing unit, which is operable as a function of the temperature of a pair of Siamese fluid containing bulbs. One of the bulbs, adapted to control the starting of the refrigerant condensing unit immediately upon the insertion of a warm freezing tray in the hollow freezing sleeve, is associated in thermal conductive relation to a grid adapted to be employed in such freezing tray. The other bulb of the pair, adapted to discontinue the operation of the condensing unit upon the freezing of a substance contained in the tray, is disposed in thermally conductive relation to the end of a suction line, the temperature of which is reduced by the evaporation of refrigerant liquid therein.

For a better understanding of the invention, reference may now be had to the accompanying drawing forming a part of this specification in which:

Figure 1 is a fragmentary cross-sectional view of a refrigerator cabinet embodying an evaporating unit characterizing the principal features of the invention;

Figure 2 is a longitudinal cross-sectional view of the evaporating unit illustrated by Figure 1;

Figure 3 is a diagrammatical view illustrating a refrigerant condensing unit capable of employment in a refrigerating apparatus embodying the invention.

Referring particularly to Figure 1 of the drawing, the numeral 11 designates a portion of a refrigerator cabinet in which a refrigerant evaporating unit 12 is supported in any suitable manner shown. The upper portion of the refrigerant evaporating unit 12 comprises a tank 13 having an opening 14 in an upper portion thereof through which a brine solution is adapted to be introduced. A removable cap 16 associated with the opening 14 is adapted to prevent loss of the brine solution in the tank 13 through evaporation or other causes.

Sleeves 17 and 18, projecting internally of the tank 13, receive trays 19 and 21, respectively, adapted to contain fluid substances for preservation or freezing. A refrigerant fluid compressor 22 of a refrigerant condensing unit 23, is adapted to be connected by a suction line 24 with one end of a refrigerant liquid evaporating conduit 26 located within the brine tank 13 and surrounding the freezing tray sleeves 17 and 18.

The opposite end of the evaporating conduit 26 is connected externally of the tank 13 to a coupling member 27 communicating with one end of a hollow refrigerant fluid evaporating sleeve 28. The latter consists of a pair of spaced sheet metal plates 29 and 30 which are welded, or otherwise rigidly secured together, around edges thereof, and likewise welded along parallel depressed portions 31 disposed intermediate the longitudinal edges of the plates and terminating in spaced relation to the end portions thereof. The spaced and reinforced plate structure thus constructed is curved longitudinally to form an oval shaped tray receiving sleeve 28. The adjacent registering end portions of the plates are welded as indicated at 32.

The opposite end portion of the sleeve 28 is connected by a coupling member 34 to a conduit 36 communicating with a refrigerant fluid expansion valve 38. A boss 39, to which an expansion valve 38 is secured by bolts or other suitable means (not shown), is rigidly secured in an opening formed in a metallic casing 41 secured to the lower edges of the tank 13 as indicated at 42. The refrigerant evaporating sleeve 28 is supported upon the lower portion of the aforesaid metallic casing. The expansion valve 38 communicates, through a high pressure conduit 43 with a liquid receiver 44 of a condenser 46 into which the compressor 22 discharges compressed refrigerant fluid from the evaporating unit.

A thermostat 47, supported by a bracket 48, is secured to a wall of the refrigerator cabinet 11, and is adapted to open and close an electrical circuit through a motor 49 when predetermined minimum and maximum temperatures, respectively, obtain in the portions of the evaporating unit controlling the operation of the thermostat. The thermostat 47 is connected by a small conduit 49 and a pair of branch conduits 51 and 52 with a pair of fluid containing bulbs 53 and 54, respectively. The bulb 53 is connected by a metallic clip 56 to the refrigerant evaporating unit suction line 24 or it may be mounted fixedly in contact with the suction conduit within the brine tank or immersed in the brine at a suitable point, while the bulb 54 is inserted in a curved portion 57 of an elongated resilient contacting device 58. In order to prevent the fluid in the bulbs 53 and 54 from entirely condensing in the bulb which happens, at any particular time, to be at a lower temperature than the other, it is essential that the total quantity of liquid contained therein shall be more than would be required to fill either of the bulbs and the conduit by which it is connected to the conduit 49.

The contacting device is supported by a sheet or bar of hard fibre 59, or other suitable material having good heat insulating properties, which in turn is secured to the lower surface of the registering ends of the metallic sheets 29 and 30. The opposite ends of the contacting device 58 are curved downwardly as indicated at 61 and 62 in substantially vertical parallel planes extending longitudinally of the freezer 28.

The portions 61 and 62 of the contacting device 58 are adapted clampingly to engage upwardly projecting longitudinal portions 63 and 64, respectively, of a freezing tray grid 66. The latter is supported in a freezing tray 67, adapted to be received in the freezer 28, upon widely separated projecting portions 68 of the grid which maintain the latter within the tray in spaced relation to the side portions and bottom thereof.

It is apparent that when the freezing tray 67, containing a warm fluid substance desired to be frozen and the grid 66, is inserted in the freezer 28, the upwardly projecting portions 63 and 64 of the latter will slidably engage the portions 61 and 62 respectively of the contacting member 58, as a result of which the heat will be immediately conducted to the bulb 54 of the thermostat 47. Since the pressure in the fluid system embodying the two fluid containing bulbs is a function of the higher temperature in either bulb, the thermostat 46 will be actuated to close the circuit through the motor 49, employed in operating the condensing unit 23, as a result of which the refrigerant fluid pressure in the evaporating unit will be reduced sufficiently to cause the expansion of fluid from the valve 38 into the conduit 36 and the freezer 28. Since the fluid substance in the tray 67 is in thermal contact with the freezer 28 through both the tray 67 and the grid contacting device 58, the heat of the substance will be transmitted to the evaporating unit 28 at a very rapid rate. This evaporation of fluid in the freezer 28 will continue for an extended period until the substance in the tray 67 is substantially frozen and its temperature materially reduced. The fluid within the bulb 54 will also be reduced in temperature and may fall below the temperature of that in the bulb 53 in which case the pressure within the bulb 53 will be the higher of the two and thereby maintain sufficient pressure in the two bulb systems to maintain the thermostat in a closed position. When liquid eventually is discharged into the evaporating conduit 26, it likewise will be evaporated therein for a considerable period of time before any of such fluid is discharged into the end of the suction line 24 with which the bulb 53 is connected. However, when such evaporation of fluid eventually occurs in the end of the suction line, the temperature of the bulb 53 will be reduced sufficiently to change the total pressure in the fluid system embodying the two thermostat bulbs thereby causing the thermostat 47 to open the circuit through the motor 49. When such conditions of operation occur in a refrigerating apparatus constructed according to the principles of this invention, the fluid substance in the freezing tray 67 will be entirely frozen.

Although the specification discloses only the preefrred form of this invention, and describes in detail but a single application thereof, it will be apparent to those skilled in the art that the invention is not so limited but that various modifications and changes may be made therein without departing from the spirit of the invention or from the scope of the appended claims.

I claim:—

1. An artificial refrigeration apparatus comprising a refrigerant fluid evaporating device adapted to receive a freezing tray therein, a grid having upwardly projecting portions disposed in said freezing tray, a metallic contacting member in thermal contact with said upwardly projecting portions, a fluid containing bulb in thermal contact with the contacting member, and a thermostat actuated by the aforesaid bulb for initiating the operation of a refrigerant condensing unit.

2. An automatic refrigeration apparatus comprising a refrigerant fluid evaporating device adapted to receive a freezing tray internally thereof, a grid having widely separated supporting portions disposed within the aforesaid tray, and means in intimate thermal contact with the grid for initiating the operation of a refrigerant condensing unit in response to an increase in the temperature of the aforesaid grid.

3. An automatic refrigeration apparatus comprising a brine tank containing a refrigerant fluid evaporating conduit, a hollow freezing sleeve adapted to support a freezing tray disposed exteriorly of and in spaced relation to the brine tank, said sleeve being composed of a spaced pair of curved metallic plates secured rigidly together to provide a chamber therebetween, means for connecting one end of the evaporating conduit in the brine tank to one end of the sleeve, and an expansion valve for discharging a refrigerant fluid into the opposite end of the aforesaid sleeve.

4. A refrigerant fluid evaporating unit comprising a brine tank having an evaporating conduit disposed therein, a metallic casing supported by the brine tank, said casing having vertical sides disposed in the planes of the sides of the brine tank, and a hollow refrigerant fluid evaporating sleeve adapted to support a freezing tray disposed within the casing and operatively connected to the aforesaid evaporating conduit.

5. A refrigerant evaporating unit comprising a brine tank having a freezing tray sleeve formed interiorly thereof, a freezing tray sleeve comprising a pair of spaced metallic walls forming a chamber for the reception of refrigerant positioned exteriorly of the brine tank, an evaporating conduit disposed within the tank and having one extremity communicating with the chamber, and means for supplying refrigerant first to the chamber then to the evaporating conduit.

In testimony whereof I hereunto affix my signature.

CHARLES C. THOMAS.